United States Patent [19]

O'Connor et al.

[11] Patent Number: 4,544,730

[45] Date of Patent: Oct. 1, 1985

[54] MODIFIED POLYURETHANE LIQUID POLYMER COMPOSITIONS

[75] Inventors: James M. O'Connor, Clinton; Donald L. Lickei, Cheshire; Michael L. Rosin, Madison, all of Conn.

[73] Assignee: Olin Corporation, Cheshire, Conn.

[21] Appl. No.: 667,695

[22] Filed: Nov. 2, 1984

Related U.S. Application Data

[60] Division of Ser. No. 571,216, Jan. 16, 1984, , which is a continuation-in-part of Ser. No. 419,684, Sep. 20, 1982, abandoned, which is a division of Ser. No. 203,212, Nov. 30, 1980, abandoned.

[51] Int. Cl.$^4$ .................. C08G 18/48; C08L 75/00
[52] U.S. Cl. .................. 528/78; 524/425; 524/428; 524/451; 524/452; 524/455; 524/495; 525/455; 528/75; 536/18.3
[58] Field of Search .................. 528/75, 78, 81; 525/455; 536/18.3; 524/590, 425, 428, 451, 452, 455, 495

[56] References Cited

U.S. PATENT DOCUMENTS 4,312,972  1/1982  Khanna .................. 528/75

Primary Examiner—Jacob Ziegler
Attorney, Agent, or Firm—William D. Sabo

[57] ABSTRACT

A novel, heat curable, liquid polymer composition is disclosed which comprises a modified urethane oligomer containing terminal ethylenic unsaturation and a free radical catalyst. In a preferred embodiment, the polymer composition further includes at least one additional component selected from a reinforcing agent and a filler; the cured composition demonstrates enhanced impact properties and is particularly useful in automotive body constructions.

10 Claims, No Drawings

MODIFIED POLYURETHANE LIQUID POLYMER COMPOSITIONS

This application is a division of copending application Ser. No. 571,216, filed Jan. 16, 1984, which is a continuation-in-part of application Ser. No. 419,684, filed Sept. 20, 1982, now abandoned, which is a division of application Ser. No. 203,212, filed Nov. 3, 1980, now abandoned.

This invention relates to a select urethane oligomer system, and, more particularly, to a liquid polymer composition containing a modified urethane oligomer having terminal ethylenic unsaturation.

The use of plastic materials for exterior components in automotive construction has been steadily increasing over recent years. Fuel economy requirements are continuing to dictate vehicular weight reduction which portends even more extensive utility of plastics.

In the area of rigid plastic automotive components, fiberglass-reinforced thermosetting polyesters have found widespread application. These polyester resin formulations have been favorably accepted due to their overall physical capabilities (e.g., dimensional stability, strength, high temperature resistance, and paint adhesion). Facility of handling and machining also has fostered favor. However, these polyester systems remain to be beset by certain deficiencies. The brittle nature that is characteristic of polyester compounds and composites can lead to severe impact and fatigue problems. Surface smoothness and shrinkage control also have presented formidable difficulties.

Various additives have been suggested for introduction into polyester sheet molding compounds (SMC) and bulk molding compounds (BMC) to relieve shrinkage and surface problems or to improve impact resistance. The addition of liquid polymers, such as polybutadiene (e.g., U.S. Pat. No., 4,020,036 issued to Aubrey South, Jr. on Apr. 26, 1977), has been taught to serve well in regard to toughening polyester products; but due to incompatibility, storage of such pre-mixes is difficult. Saturated diacids or long-chain glycols also have been used to prepare polyester resins; the resulting polyester products have been flexibilized, but, at the cost of lower mechanical and thermal properties.

An approach relating to the introduction of urethane chemicals to a polyester resin system is described in U.S. Pat. No. 4,062,826 issued to Francis Gowland Hutchinson et al on Dec. 13, 1977. Here, precursors of a cross-linked polyurethane are taught to be polymerized within a mixture of ethylenically unsaturated polyester and vinyl monomer to form a product with an interpenetrating polyurethane gel network within the polyester cross-linked structure. However, while higher impact strengths are reported to be achieved, the fine surfce finish required for automotive body part applications still is not accomplished. (G. Forger, "Toughened SMC", Plastics World, page 63, June, 1978.)

It has now been discovered, according to the present invention, that a heat curable liquid polymer composition can be prepared comprising a modified urethane oligomer containing terminal ethylenic unsaturation and a free radical catalyst. Such a composition features the advantages of a one-component storage stable system that requires only heat for activation; the cured composition is useful in preparing a wide variety of coatings and castings.

In a particularly preferred form of the invention, the polymer composition may include at least one additional component selected from a reinforcing agent and a filler. The cured plastic products feature improved impact properties and are suitable for many of the same utilities as thermoset polyester resin compositions such as parts for automotive body applications.

The polyurethane oligomer that is utilized according to the invention is prepared by first reacting an organic polyisocyanate with a polyol using standard procedures and in such proportions, so as to yield an isocyanate-terminated prepolymer of controlled molecular weight having a free NCO content ranging from about 0.5% to about 30%. Preferably, the prepolymer has a free NCO content ranging from about 5% to about 20%. In a preferred procedure, the reaction is accelerated by employing a catalyst, although the reaction may be carried out in the absence of a catalyst. Common urethane catalysts, e.g., tertiary amines and metal compounds such as stannous octoate or dibutyltin dilaurate may be used. In forming the prepolymer, it is also preferred to include, chain extenders, well known to those in the polyurethane art, in the reaction mixture. These chain extenders include low molecular weight glycols such as ethylene glycol, butane diol hexane diol, propylene glycol, bisphenol A, and the like. Other suitable chain extenders are polyether polyols, or mixtures of polyols, having an average equivalent weight ranging from about 400 to about 4,000 and an average functionality of about 2. The amount of chain extender employed can vary broadly depending upon the amount of polyol reactant used in preparing the polyurethane oligomer.

The polyol reactant used in the prepolymer formation is selected from polyether polyols and mixtures of two or more such compounds. The polyol, or mixture of polyols, should have an average equivalent weight ranging from about 75 to about 500. Preferably, the average equivalent weight is about 75 to about 350, and more preferably about 90 to about 200. The average functionality of the polyol or polyol blend is at least about 3, preferably about 3 to about 8, and more preferably about 3.5 to about 6.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether polyol reactant includes the following and mixtures thereof: (a) the aliphatic triols such as glycerol, trimethylolpropane, triethylolpropane, trimethylolhexane, and the like; and (b) higher functionality alcohols such as sucrose, dextrose, sorbitol, pentaerythritol, methyl glucoside, and the like.

Preferably, the polyhydric initiator which is employed comprises a carbohydrate or a carbohydrate derivative. Illustrative are sucrose, dextrose, methyl glucoside and mixtures thereof. In a particularly preferred embodiment, the polyhydric initiator includes a mixture of a carbohydrate or a carbohydrate derivative with at least one aliphatic diol or triol. Exemplificative of the latter are water, ethylene glycol, propylene glycol, the butylene glycols, glycerol, trimethylolpropane, triethylolpropane, the alkanolamines, and the like, and mixtures thereof.

The most preferred group of polyhydric initiators for use in preparing the polyether polyol reactant is one which comprises mixtures of sucrose or dextrose with an aliphatic triol, preferably glycerol.

The alkylene oxide-polyhydric initiator condensation reaction is preferably carried out in the presence of a catalyst such as KOH as is well known in the art. In effecting the reaction, a sufficient proportion of alkylene oxide is used, so as to provide a final polyol product having an average equivalent weight of about 75 to about 500, preferably about 75 to about 350, and more preferably about 90 to about 200. The catalyst is thereafter preferably removed, leaving a polyether polyol which is ready for use in preparing the isocyanate-terminated prepolymer of the invention.

The organic polyisocyanates used in the polyurethane prepolymer formation include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), xylene diisocyanate, 3,3'-bitoluene-4,4'-diisocyanate, hexamethylene diisocyanate, naphthalene 1,5-diisocyanate, the polymeric isocyanates such as polyphenylene polymethylene isocyanate, and the like, and mixtures thereof. Toluene diisocyanate is preferred.

To form the polyurethane oligomer that is utilized according to the invention, the prepared isocyanate-terminated prepolymer, as defined above, is then reacted with an isocyanate reactive group-containing unsaturated monomer. The reaction is carried out using methods well known in the art and employing such relative proportions of the reactants so as to achieve an oligomer product having a final free NCO content of from 0% to about 20%, preferably 0% to about 10%, and most preferably 0% to about 5%. Suitable isocyanate reactive group-containing unsaturated monomers include hydroxyalkyl acrylates, hydroxyalkyl methacrylates and hydroxyalkyl acrylamides such as hydroxyethyl acrylate, hydroxypropyl acrylate, hydroxyethyl methacrylate, hydroxypropyl methacrylate, hydroxyethyl acrylamide, hydroxyprophyl acrylamide, and the like. By reaction of the isocyanate-terminated prepolymer with the unsaturated monomer, a controlled moclecular weight urethane oligomer with terminal reactive unsaturation is produced. Preferably, the reaction is carried out in the presence of a reactive copolymerizable solvent. Suitable copolymerizable solvents include vinylidene compounds such as styrene, vinyl toluene, methacrylic esters, acrylic esters, divinyl benzene, and the like, familiar to those skilled in the art. The amount of copolymerizable solvent employed may be varied over a wide range. Generally, however, the copolymerizable solvent is employed in an amount of from about 0 to about 100 parts by weight per 100 parts by weight of the urethane oligomer of the present invention.

The modified urethane oligomer liquid polymer system is polymerized and cured in the presence of a heat activated, free radical generating catalyst. The actual curing temperature is dependent on the particular catalyst employed. Suitable free radical catalysts include peroxide or azo type compounds, known to those in the art. Typical peroxide catalysts are illustrated by organo peroxides and hydroperoxides such as benzol peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. Typical azo compounds are azobis-isobutyronitrile, 2-t-butylazo-2-cyano-4-methylpentane, and 4-t-butylazo-4-cyano-valeric acid. The preferred catalysts are peroxide catalysts. In particular, preferred peroxide catalysts are t-butyl peroctoate, t-butyl perbenzoate, and mixtures thereof. Any suitable catalytic amount may be employed; however, the catalyst generally is used in an amount from about 0.1 to about 10 parts by weight per 100 parts by weight of the oligomer.

The composition of the present invention may also contain other standard ingredients, if desired, such as fillers (e.g., finely divided solids including $CaCO_3$, clay, alumina, talc, glass microspheres, and the like) and reinforcement materials (e.g., chopped fiberglass, carbon fibers, asbestos fibers, boron nitride whiskers, and the like) Other ingredients may include internal mold release agents, such as calcium, zinc, magnesium, or sodium stearate. Pigments, dyes, stabilizers viscosity modifiers (e.g., Group II metal oxides and hydroxides, such as magnesium oxide) and various additives familiar to those skilled in thermosetting polyester technology also may be added. Other low shrink or impact additives also may be included, if desired. A typical formulation generally contains, per 100 parts by weight of the polyurethane oligomer, reinforcement materials in an amount ranging from about 10 to about 150 parts by weight and from about 20 to about 400 parts by weight of fillers.

The following examples are provided to further illustrate the invention. All parts are by weight unless otherwise specified.

PREPARATION OF POLYURETHANE OLIGOMER

EXAMPLE 1

To 348 grams (4.0 eq) of diisocyanate and 0.2 ml of stannous octoate were added dropwise with stirring 562 grams of styrene and 147 grams (1 eq.) of a polyether polyol over a two-hour period. The mixture was heated to 80° C. for one hour, then cooled to 60° C. and 348 grams (3 eq.) of a hydroxyethyl acrylate were added. The mixture was again heated to 80° C. for one hour, and then cooled to room temperature. Next, 500 ppm of hydroquinone were added to the fluid mixture.

The polyether polyol used had a molecular weight of about 650 and was prepared by condensing a sucrose/glycerol mixture with propylene oxide to a final hydroxyl number of about 375. The diisocyanate was a mixture of toluene diisocyanate isomers (80:20 mixture of 2,4/2,6-isomers).

EXAMPLES 2–4

Additional polyurethane ologomers were prepared employing the same conditions as outlined in Example 1. However, different proportions of reactants were used to form prepolymers. These prepolymers were reacted with suitable proportions of hydroxyl-containing unsaturated monomers to produce oligomers according to the invention. Table I outlines the oligomer compositions prepared according to Examples 1–4.

EXAMPLE 5

The procedure of Example 1 was followed, except that different proportions of reactants were used and diisocyanate was added dropwise to the mixture of polyether polyol and styrene. The oligomer composition which was prepared is outlined in Table I.

TABLE I

| | | | OLIGOMER COMPOSITIONS | | | |
|---|---|---|---|---|---|---|
| Example | Polyols (eq.) A[1] | B[2] | Unsaturated Monomer[3] (eq.) | Diisocyanate[4] (eq.) | Styrene (grams) | Hydroquinone (ppm) |
| 1 | 1.0 | 0 | 3.0 | 4.0 | 562 | 500 |
| 2 | 0 | 1.0 | 3.0 | 4.0 | 562 | 500 |
| 3 | 1.0 | 0 | 1.5 | 2.5 | 359 | 500 |
| 4[5] | 0 | 1.0 | 1.5 | 2.5 | 331 | 500 |
| 5 | 1.0 | 0 | 1.5 | 2.5 | 359 | 500 |

[1]Polyol A is a polyether polyol having a molecular weight of about 650 and was prepared by condensing a sucrose/glycerol mixture with propylene oxide to a final hydroxyl number of about 375.
[2]Polyol B is a polyether polyol having a molecular weight of about 480 and was prepared by condensing a sucrose/glycerol mixture with propylene oxide to a final hydroxyl number of about 530.
[3]Hydroxyethyl acrylate.
[4]The diisocyanate is a mixture of toluene diisocyanate isomers (80:20 mixture of 2,4/2,6-isomers).
[5]The viscosity (25° C.) of the oligomer composition was 2,200 cps after three days and increased to 3,800 cps after one week.

EXAMPLE 6

174 Grams (2.0 eq.) of diisocyanate and 253 grams of styrene were mixed together in a one-liter, round bottom flask equipped with mechanical stirrer, thermometer and dropping funnel. 52.5 Grams (0.5 eq.) of a polyether polyol and 36.5 grams (0.5 eq.) of a chain extender were mixed and were added to the diisocyanate-styrene mixture in a dropwise fashion over a period of 110 minutes. The reaction temperature rose from 27° to 47° C. during the addition period. The reaction mixture was stirred at ambient conditions for two hours, after which 0.3 ml of stannous octoate was added. The reaction temperature went from 43° to 56° C. and the reaction mixture was stirred one additional hour. 116 Grams of hydroxyethyl acrylate were added in a dropwise fashion over a period of 15 minutes. No change in reaction temperature was noted during the addition of hydroxyethyl acrylate. The reaction mixture was stirred at 80° C. for one hour when an IR spectrum showed—NCO and—OH absorptions. The reaction mixture was allowed to stand overnight at room temperature. The reaction mixture still showed a slight—NCO absorption so heating at 80° C. was continued for an additional two hours. At this point, no—NCO absorption was observed by IR, however, a strong (NH) absorption was present. The reaction mixture was bottled. The sample was used to make molded parts. The sample did not change in appearance after one month—it remained a hazy, fluid solution. (Viscosity [25° C.] 3,200 cps)

The polyether polyol used had a molecular weight of about 480 and was prepared by condensing a sucrose/glycerol mixture with propylene oxide to a final hydroxyl number of about 530. The diisocyanate was a mixture of toluene diisocyanate isomers (80:20 mixture of 2,4/2,6-isomers). The chain extender was 2-ethyl-1,3-hexane diol.

EXAMPLE 7

174 Grams of diisocyanate and 251 grams of styrene were mixed together in a one-liter, round bottom flask equipped with thermometer, mechanical stirrer and addition funnel. 52.5 Grams (0.5 eq.) of a polyether polyol and 33.5 grams (0.5 eq.) of a chain extender were mixed together and added to the diisocyanate-styrene mixture in a dropwise manner over a period of 1½ hours. The reaction temperature rose from 24° to 35° C. during the addition period. The reaction mixture was stirred at ambient temperature for one hour, after which 0.3 ml of stannous octoate was added to the mixture—reaction temperature rose from about 32° to 69° C. The reaction mixture was allowed to stir an additional two hours at ambient temperature. 116 Grams (1.0 eq.) of hydroxyethyl acrylate were added to the reaction mixture over a period of 10 minutes. No exotherm was observed. The reaction mixture was heated for 1½ hours at 80° C. and then allowed to stand overnight. An IR spectrum showed only a trace of—NCO, and the hazy yellow liquid was bottled. (Viscosity [22° C.] 3,600 cps)

The polyether polyol used had a molecular weight of about 480 and was prepared by condensing a sucrose/glycerol mixture with propylene oxide to a final hydroxyl number of 530. The diisocyanate was a mixture of toluene diisocyanate isomers (80:20 mixture of 2,4/2,6-isomers). The chain extender was dipropylene glycol.

EXAMPLE 8

To 87.0 grams (1.0 eq.) of diisocyanate, 141.8 grams of styrene and 0.71 grams of hydroquinone were added dropwise with stirring a mixture of 36.7 grams (0.25 eq.) of a polyether polyol and 24.0 grams (0.25 eq.) of a chain extender over a period of 45 minutes. The reaction temperature rose from 18° to 23° C., and the mixture was stirred without heating for 75 minutes. To this mixture were added dropwise with stirring 65.0 grams (0.5 eq.) of hydroxypropyl acrylate over a period of 25 minutes. The resulting mixture was stirred for 60 minutes without heating, when 0.68 ml of dibutyltin dilaurate was added. The reaction temperature climbed from 24° to 52° C. within five minutes. The mixture was then heated to 70° C. and was stirred at 70° C. for three hours. The product had a viscosity of 1,100 cps at 26° C.

The polyether polyol used had a molecular weight of about 650 and was prepared by condensing a sucrose/glycerol mixture with propylene oxide to a final hydroxyl number of about 375. The diisocyanate was a mixture of toluene diisocyanate isomers (80:20 mixture of 2,4/2,6-isomers). The chain extender was tripropylene glycol.

EXAMPLE 9

The procedure of Example 9 was followed, except that 58 grams (0.5 eq.) of hydroxyethyl acrylate were used in place of hydroxypropyl acrylate, and 137.1 grams of styrene were used.

EXAMPLE 10

To 174 grams (2.0 eq.) of diisocyanate in a one-liter, round bottom flask were added dropwise with stirring a mixture of 105 grams (1.0 eq.) of a polyether polyol and 273 grams of styrene over a period of four hours. The reaction temperature rose from 22° to 26° C. during the addition period. After the reaction mixture was allowed to stand at room temperature overnight, 130 grams (1.0 eq.) of hydroxypropyl acrylate were added to the mixture over a period of 30 minutes. The reaction temperature rose from 22° to 26° C. within one hour of the addition. The reaction mixture was again allowed to stand overnight, after which 0.4 ml of stannous octoate was added. The mixture was again allowed to stand overnight, and was then heated at 70° C. for four hours with stirring. The resulting homogeneous liquid had a viscosity of 41,000 cps at 25° C.

The polyether polyol used had a molecular weight of about 480 and was prepared by condensing a sucrose/glycerol mixture with propylene oxide to a final hydroxyl number of 530. The diisocyanate was a mixture of toluene diisocyante isomers (80:20 mixture of 2,4/2,6-isomers).

EXAMPLE 11

To 348 grams (4.0 eq.) of diisocyanate, 569 grams of styrene, and 0.142 grams of hydroquinone in a two-liter, round bottom flask were added dropwise with stirring a mixture of 235.0 grams (0.8 eq.) of a polyether polyol and 38.4 grams (0.2 eq.) of a chain extender over a period of one hour. The reaction temperature rose from 23° to 30° C. during the addition period. The mixture was stirred without heating for one hour, after which 232 grams (2.0 eq.) of hydroxyethyl acrylate were added to the mixture over a period of 30 minutes. The resulting mixture was stirred without heating for one hour and 2.84 grams of dibutyltin dilaurate were added. The mixture was then heated to 70° C. and was stirred at 70° C. for a period of three hours. The resulting oligomer had a viscosity of 4,800 cps at 23° C.

The polyether polyol used had a molecular weight of about 650 and was prepared by condensing a sucrose/glycerol mixture with propylene oxide to a final hydroxyl number of about 375. The diisocyanate was a mixture of toluene diisocyanate isomers (80:20 mixture of 2,4/2,6-isomers). The chain extender was tripropylene glycol.

EXAMPLE 12

To 255.6 grams of diisocyanate, 479 grams of styrene, and 0.12 grams of hydroquinone in a two-liter, round bottom flask were added dropwise with stirring a mixture of 43.2 grams of a polyether polyol and 249.0 grams of a chain extender over a period of one hour. The reaction temperature rose from 23° to 26° C. during the addition period. The mixture was stirred without heating for one hour, after which 170.6 grams of hydroxyethyl acrylate were added to the mixture over a period of 30 minutes. The reaction temperature rose from 28° to 33° C. during this addition period. The resulting mixture was stirred without heating for one hour and 2.4 grams of dibutyltin dilaurate were added. The mixture was then heated to 70° C. and was stirred at 70° C. for a period of three hours. The resulting oligomer had a viscosity of 285 cps at 24° C.

The polyether polyol used had a molecular weight of about 650 and was prepared by condensing a sucrose/glycerol mixture with propylene oxide to a final hydroxyl number of about 375. The diisocyanate was a mixture of toluene diisocyanate isomers (80:20 mixture of 2,4/2,6-isomers). The chain extender was a polyether polyol having a molecular weight of about 425 and being prepared by propoxylating dipropylene glycol to a final hydroxyl number of about 265.

EXAMPLE 13

To 196.6 grams of diisocyanate, 598.8 grams of styrene, and 0.15 grams of hydroquinone in a two-liter, round bottom flask were added dropwise with stirring a mixture of 94.95 grams of a polyether polyol and 459.6 grams of a chain extender over a period of 68 minutes. The reaction temperature rose from 22° to 26° C. during the addition period. The mixture was stirred without heating for one hour, after which 147 grams of hydroxypropyl acrylate were added to the mixture over a period of 30 minutes. The resulting mixture was stirred without heating for one hour and 3.0 grams of dibutyltin dilaurate were added. The mixture was then heated to 70° C. and was stirred at 70° C. for a period of three hours. The resulting oligomer had a viscosity of 1,080 cps at 25° C.

The polyether polyol used had a molecular weight of about 480 and was prepared by condensing a sucrose/glycerol mixture with propylene oxide to a final hydroxyl number of about 530. The diisocyanate was a mixture of toluene diisocyanate isomers (80:20 mixture of 2,4/2,6-isomers). The chain extender was a polyether polyol having a molecular weight of about 4,000 and being prepared by propoxylating dipropylene glycol to a final hydroxyl number of about 28.

PREPARATION OF URETHANE MOLDINGS

EXAMPLE 14-24

Test panels were prepared containing varying amounts of polyurethane oligomer prepared according to Examples 1, 4 and 6. The urethane molding formulations used are listed in Tables II and III below. The following procedure was followed in the preparation of the cured composites.

a. Into a high shear mixing device were added the urethane oligomer, styrene, other monomers, low shrink additive, catalyst and pigments.
  b. The filler was added gradually and mixed until a homogeneous paste was obtained.
  c. Next chopped fiberglass was gradually added to the paste in a two-roll mill (or Baker Perkins mixer or Ross Double Planetary mixer) and the mix was worked the minimal length of time to achieve good wet out of the glass without significant breakdown.
  d. The uncured mix was then placed in a mold between the platens of a compression molding machine and cured under pressure (2,000 psi) for three minutes at 300°-325° F.

Alternatively to (d), the mixture may be added by a hopper device to the screw system of an injection molding device to produce an injection molded part, or the mix may be made up on an SMC machine for later compression or injection molding.

The physical properties of panels prepared in this manner are included in Table IV below. The physical properties were determined in accordance with standard test procedures: Flexural modulus and flexural strength—ASTM D790; tensile strength ASTM D3574; izod—ASTM D256; and coefficient of thermal expansion—ASTM D696.

TABLE II

| URETHANE MOLDING FORMULATION (SMC/BMC)[1] | |
|---|---|
| Component | Parts by Weight |
| Polyurethane Oligomer | 65 (40% Styrene) |
| Tertiary Butyl Perbenzoate | 0.5 |
| Tertiary Butyl Peroctoate[1] | 0.5 |
| Zinc Stearate | 3.0 |
| Calcium Carbonate | 150 |
| Carbon Black | 5.0 |
| Magnesium Oxide | 1.8 |
| ½ Inch Glass | 101 |

TABLE II-continued

| URETHANE MOLDING FORMULATION (SMC/BMC)[1] | |
|---|---|
| Component | Parts by Weight |
| Styrene and Low Shrink Additive[2] | 35 |

[1]Commercially available from Lupersol Co. under the designation PDO, understood to consist of 50% tertiary butyl peroctoate and 50% dioctyl phthalate.
[2]The additions of low shrink additive replace styrene maintaining the sum of additive and styrene constant at 35 parts.

TABLE III

| URETHANE MOLDING FORMULATION (SMC/BMC)[2] | |
|---|---|
| Component | Parts by Weight |
| Polyurethane Oligomer | 65 (40% Styrene) |
| Tertiary Butyl Perbenzoate | 0.5 |
| Tertiary Butyl Peroctoate[1] | 0.5 |
| Zinc Stearate | 3.0 |
| Calcium Carbonate | 150 |
| Carbon Black | 5.0 |
| Magnesium Oxide | 1.8 |
| ½ Inch Glass | 101 |
| Styrene | 35 |
| Low Shrink Additive[2] | 0-25 |

[1]Commercially available from Lupersol Co. under the designation PDO, understood to consist of 50% tertiary butyl peroctoate and 50% dioctyl phthalate.
[2]Low shrink additive is added in increments to the standard formulation.

PREPARATION OF URETHANE MOLDINGS

EXAMPLES 25-31

Test panels were prepared containing varying amounts of polyurethane oligomer prepared according to Examples 6 and 10-13. The following procedure was followed in the preparation of the cured panels.

a. The polyuethane oligomer was mixed with the free radical generating catalyst, and the resulting mixture was degassed by placement in a vacuum dessicator at about 1-10 torr pressure for a period of approximately 1-2 minutes or until initial foaming subsides.

b. The degassed mixture was poured into a mold formed by glass plates coated with a liquid mold release agent, such as MR515 commercially available from Greenchem Products, Inc., and held apart by 1/16 inch spacers.

c. The mold was then placed under conditions appropriate for curing, and after completion of the curing cycle, the panels were demolded and tested.

The physical properties of panels prepared in this manner are included in Table V below. The physical properties were determined in accordance with standard test procedures: Flexural modulus and flexural strength—ASTM D790; tensile strength—ASTM D3574; izod—ASTM D256; and coefficient of thermal expansion—ASTM D696.

TABLE IV

PHYSICAL PROPERTIES OF CURED URETHANE OLIGOMERS

| Example | Oligomer | Formulation | Additives/pph Urethanes | Tensile Strength (psi) | Flex. Strength (psi) | Flex. Modulus × $10^6$ (psi) | Izod (ft.-lb./in.) Notched | Izod (ft.-lb./in.) Unnotched | Coeff. of Thermal Expansion Mcm/cm/°C. |
|---|---|---|---|---|---|---|---|---|---|
| 14 | Polyester resin[1] | 1 | LP-40A[2]/7.8 Olin Low Shrink[3]/10 | 4080 | — | 1.06 | 3.94 | — | — |
| 15 | Example 1 | 1 | Ethylene dimethyl acrylate Olin Low Shrink[3]/10 | 4546 | — | 1.26 | 5.16 | — | — |
| 16 | Example 1 | 1 | Polyester resin[1] | 5355 | — | 0.80 | 5.84 | — | — |
| 17 | Polyester resin[1] | 2 | — | 6817 | 15,000 | 1.0 | 8.7 | 10.6 | — |
| 18 | Example 4 | 2 | — | 4577 | 19,000 | 1.1 | 8.9 | 12.4 | 15.8 |
| 19 | Example 4 | 2 | LP-40A[2]/14.0 | 3528 | 7,000 | 0.9 | 2.5 | 5.6 | 14.2 |
| 20 | Example 4 | 2 | Olin Low Shrink[3]/5 | 7705 | 16,000 | 0.9 | 9.7 | 12.5 | 13.1 |
| 21 | Example 4 | 2 | Olin Low Shrink[3]/10 | 4563 | 7,000 | 0.6 | 9.1 | 10.6 | 11.4 |
| 22 | Example 4 | 2 | Olin Low Shrink[3]/15 | 6635 | 6,000 | 0.5 | 8.8 | 9.2 | 12.5 |
| 23 | Example 4 | 2 | Olin Low Shrink[3]/20 | 4254 | 6,000 | 0.6 | 6.6 | 8.9 | 14.2 |
| 24 | Example 4 | 2 | Olin Low Shrink[3]/25 | 3434 | 6,000 | 0.5 | 11.1 | 15.0 | 15.1 |

[1]Commercially available from Hatco under the designation GR 13031.
[2]LP-40A is a low shrink additive commercially available from Union Carbide.
[3]The Olin low shrink additive was prepared by first mixing together 391 grams (0.2 eq.) of polyether polyol and 178 grams of styrene solvent (30% by weight of final material). 0.2 Ml of stannous octoate was added to the mixture followed by 0.24 eq. (21 grams) of diisocyanate added in one portion at ambient temperature. After several minutes, the exotherm had reached 35-37° C. and external heat was applied. The reaction mixture was stirred at 70° C. for one hour. 0.04 Eq. (4.64 grams) of hydroxyethyl acrylate was added and the reaction mixture was stirred for one additional hour at 70° C. The polyether polyol used had a molecular weight of about 4,000 and was prepared by end-capping a propoxylated dipropylene glycol precursor with ethylene oxide to a final hydroxyl number of about 28.05. The diisocyanate was a mixture of toluene diisocyanate isomers (80:20 mixture of 2,4/2,6-isomers).

TABLE V

PHYSICAL PROPERTIES OF CURED URETHANE OLIGOMERS

| Example | Oligomer | Tensile Strength (psi) | Flex. Strength (psi) | Flex. Modulus × $10^6$ (psi) | Izod (ft.-lb./in.) Notched | Izod (ft.-lb./in.) Unnotched |
|---|---|---|---|---|---|---|
| 25[1] | Example 6 | 4840 | 12,500 | 0.502 | 0.64 | 1.44 |
| 26[1] | Example 10 | 6780 | 15,600 | 0.477 | — | 1.27 |
| 27[2] | Example 6 | 5590 | 10,990 | 0.379 | 2.04 | 3.21 |
| 28[2] | polyester resin[4] | 3190 | 8,510 | 0.378 | 2.63 | 2.54 |
| 29[1] | Example 11 | 6260 | 7,660 | 0.551 | 2.49 | 5.19 |
| 30[3] | Example 12 | 9220 | 12,200 | 0.418 | 2.36 | 6.59 |

TABLE V-continued
PHYSICAL PROPERTIES OF CURED URETHANE OLIGOMERS

| Example | Oligomer | Tensile Strength (psi) | Flex. Strength (psi) | Flex. Modulus × $10^6$ (psi) | Izod (ft.-lb./in.) Notched | Izod (ft.-lb./in.) Unnotched |
|---|---|---|---|---|---|---|
| 31[3] | Example 13 | 2480 | 1,960 | 0.069 | 3.11 | 10.75 |

[1] Panels prepared using 0.5% tertiary butyl peroctoate (commercially available from Lupersol Co. under the designation PDO, understood to consist of 50% tertiary butyl peroctoate and 50% dioctyl phthalate) and 0.5% tertiary butyl perbenzoate as initiator, and cured at 120° C. for a period of one hour.
[2] Panels prepared with 1.0% methyl ethyl ketone peroxide as initiator and 0.2% cobalt naphthenate (6% mineral spirits) as an accelerator, and cured overnight at ambient temperature.
[3] Panels prepared using 1.0% tertiary butyl peroctoate (commercially available from Lupersol Co. under the designation PDO, understood to consist of 50% tertiary butyl peroctoate and 50% dioctyl phthalate) as initiator, and cured at 120° C. for a period of one hour.
[4] Commerically available from Hatco under the designation GR 13031.

What is claimed is:

1. A process for preparing a polyurethane polymer product comprising mixing a urethane oligomer, a heat activated free radical generating catalyst, and at least one additional component selected from a reinforcing agent and a filler to a homogeneous blend, and then heating said mixture at a temperature adequate to activate said catalyst and cure said mixture, said urethane oligomer having a final free NCO content from 0% to about 20% and containing terminal reactive unsaturation and being prepared by reacting
    (a) an isocyanate-terminated prepolymer having a final free NCO content ranging from about 0.5% to about 30% which is the product of reacting
        (1) an organic polyisocyanate with
        (2) a polyol having
            (i) an average equivalent weight of about 75 to about 500,
            (ii) an average functionality of at least about 3, with
    (b) an isocyanate reactive group-containing unsaturated monomer selected from the group consisting of
        (1) hydroxyalkyl acrylates,
        (2) hydroxyalkyl methacrylates and
        (3) hydroxyalkyl acrylamides.

2. The process of claim 1, wherein:
said polyol has an average equivalent weight of about 75 to about 350,
said isocyanate-terminated prepolymer has a final free NCO content ranging from about 5% to about 20%, and
said urethane oligomer has a final free NCO content of from 0% to about 5%.

3. The process of claim 2, wherein:
said polyol has an average equivalent weight of about 90 to about 200, and an average functionality of about 3.5 to about 6, and
said unsaturated monomer is selected from the group consisting of hydroxyethyl acrylate, hydroxypropyl acrylate, hydroxyethyl methacrylate, hydroxypropyl methacrylate, hydroxyethyl acrylamide and hydroxpropyl acrylamide.

4. The process of claim 3, wherein said isocyanate-terminated prepolymer further comprises a chain extending agent.

5. The process of claim 4, wherein said polyol is prepared by reacting an alkylene oxide, or a mixture of alkylene oxides, with a polyhydric initiator comprising a carbohydrate or a carbohydrate derivative.

6. The process of claim 5, wherein said polyol is prepared by reacting a polyhydric initiator selected from mixtures of sucrose or dextrose with an aliphatic triol with an alkylene oxide selected from propylene oxide and mixtures of propylene oxide with ethylene oxide.

7. The polyurethane polymer product prepared according to the process of claim 1.

8. The polyurethane polymer product prepared according to the process of claim 2.

9. The polyurethane polymer product prepared according to the process of claim 5.

10. The polyurethane polymer product prepared according to the process of claim 6.

* * * * *